United States Patent [19]
Fisher et al.

[11] 3,771,777
[45] Nov. 13, 1973

[54] CONVERTER VESSEL DRIVE USING HYDRAULIC MOTORS

[75] Inventors: Howard M. Fisher; Bernd G. Albers, both of New Castle, Pa.

[73] Assignee: Pennsylvania Engineering Corp., Pittsburgh, Pa.

[22] Filed: Dec. 29, 1971

[21] Appl. No.: 213,610

[52] U.S. Cl. .................. 266/36 P, 60/97 H, 60/483, 91/414
[51] Int. Cl. ............................................. C21c 5/50
[58] Field of Search ........................ 266/36 P, 35; 60/483, 97 R, 97 H; 91/414

[56] References Cited
UNITED STATES PATENTS

| | | | |
|---|---|---|---|
| 2,773,452 | 12/1956 | Berninger et al. | 60/53 R X |
| 2,941,365 | 6/1960 | Carlson et al. | 60/53 R X |
| 2,976,090 | 3/1961 | McFeaters | 266/36 P X |
| 3,057,161 | 10/1962 | Henke et al. | 60/53 C |
| 3,125,324 | 3/1964 | Vivier | 60/53 X |
| 3,175,354 | 3/1965 | Firth et al. | 60/53 R X |
| 3,129,781 | 4/1964 | Stein | 60/53 R X |
| 3,207,002 | 9/1965 | Lakin et al. | 266/36 P X |
| 3,653,879 | 4/1972 | Wienert | 266/36 P X |
| 3,698,690 | 10/1972 | Beaver | 60/53 |

FOREIGN PATENTS OR APPLICATIONS

| | | | |
|---|---|---|---|
| 895,162 | 7/1949 | Germany | 266/36 P |
| 1,060,887 | 10/1956 | Germany | 266/36 P |

Primary Examiner—Martin P. Schwadron
Assistant Examiner—Allen M. Ostrager
Attorney—Ralph G. Hohenfeldt et al.

[57] ABSTRACT

At least one trunnion shaft of a tiltable metallurgical vessel has a driven gear affixed thereto. A gear housing surrounds the driven gear and is journaled on the shaft. Several hydraulic motors are mounted on the gear housing. Pinions on the respective motor shafts engage directly with the driven gear. Rotation of the gear housing, due to reaction between the pinions and gear, is resisted with a torsion bar.

7 Claims, 4 Drawing Figures

3,771,777

CONVERTER VESSEL DRIVE USING HYDRAULIC MOTORS

BACKGROUND OF THE INVENTION

This invention relates to a drive mechanism for metallurgical vessels which are required to rotate or tilt about an axis to different positions in connection with phases of their operation. The invention is particularly applicable to vessels which exhibit high inertia and momentum when tilting is initiated or arrested, respectively. Typical metallurgical vessels with which the new drive mechanism may be used are those which convert impure hot metal to steel by the top or bottom blown basic oxygen method. The new drive mechanism will be described in connection with a converter vessel of this type although it will be understood by those skilled in the art that the drive mechanism is applicable to other vessels as well.

Prior mechanisms for angulating or rotating massive metallurgical vessels are generally of two types. In one type, a large driven gear is affixed to a horizontal trunnion shaft on which the vessel rotates. One or more drive motors are mounted on a foundation for driving multigear speed reducers. On the shaft of each motor is a pinion which couples the motor to its speed reducer. The pinion turns at the high speed of the motor and is inclined to wear rapidly as do the other high speed gears. The output shafts of the speed reducers also have pinions on them which mesh with the driven gear. Any reverse forces caused by oscillation of the vessel when it is brought to an abrupt stop impose severe shock stresses on these pinions which contributes to their deterioration. The large number of gears in the reduction system makes it difficult to minimize free-play in the speed reduction system. This free-play results in the vessel rotating jerkily when the motors are started and stopped. The speed reducer ratio must be very large because the trunnion shaft rotational rate desired is usually in the range of one-third to three rpm whereas the motors usually run at about one thousand rpm.

Converter vessels are normally charged by machinery that dumps tons of molten metal, scrap and other materials into them in which case they and their associated driving mechanisms are subject to high irregular shock or jarring forces. These shock forces cause premature wearing and deterioration of the gears which must then be replaced more frequently than is desirable.

When top or bottom blown converter vessels are in operation they tend to vibrate or rock at relatively high frequency to a small angle of rotation. The trunnion bearings, of course, also oscillate through a small angle of rotation as a result of which the bearing rollers Brinnell or work harden the bearing races so that they become rough or indented. Reduction in the free-play in the gears of the drive system would thus result in reduction of bearing deterioration.

The other rather commonly used type of converter drive is exemplified in U.S. Pat. No. 3,207,002. This improved type of drive also has a large driven gear affixed to the trunnion shaft of the vessel. The gear housing is journaled on the trunnion shaft and is prevented from rotating by shock absorbing stops which are interposed between the gear housing and the stand which supports the trunnion bearings. Several speed reducers are mounted on the gear housing and each has an electric motor flanged thereto. The output shaft of each speed reducer has a pinion which meshes directly with the driven bull gear. The motors all have electrically operated brakes. While this arrangement has a number of advantages, it is also disadvantageous in that it still employs high ratio speed reducers which have the backlash and free-play problems which were discussed hereinabove. Moreover, high speed gears in the speed reduction mechanism are still inclined to wear rather rapidly.

SUMMARY OF THE INVENTION

An object of the present invention is to overcome the abovenoted disadvantages of prior metallurgical vessel drive mechanisms by providing a driving system which has reversible low speed hydraulic motors that are each directly coupled by means of a single pinion to the driven or bull gear that is affixed to the vessel supporting shaft. A corollary to this object is the elimination of high ratio speed reducers between the motor and the driven gear.

Another object of this invention is to minimize free-play and backlash in the driving system.

Still another object of this invention is to use several reversible hydraulic motors which have high torque at relatively low speed so that speed reduction ratio can be minimized, thereby minimizing if not eliminating shock forces in the drive system when motion of the vessel is either initiated or arrested.

A further object of the invention is to enable employment of a tight or closely fitting gear system so as to prevent rocking and vibration of the vessel during operation and thereby minimize or eliminate bearing eccentricity or roughness that results from Brinnelling.

Yet another object of the new drive mechanism design is to minimize the space required for accommodating the driving system and to increase its reliability by virtue of the system being operable even though there is failure of one or two of the drive motors.

In general terms, the new metallurgical vessel drive system is characterized by a driven bull gear being affixed to the vessel's trunnion shaft. A gear housing is journaled on and supported by the shaft. A torsion bar arrangement is interposed between the gear housing and a stationary support so as to prevent rotation of the gear housing and to damp shock loads. Several hydraulic motors are mounted endwise on the gear housing and each of these motors has a pinion on its output shaft which meshes directly with the bull gear. The hydraulic motors have a speed range in one embodiment of zero to about thirty rpm. The vessel may be tilted or rotated at even lower speed because of the low ratio between the pinion and driven gear.

How the foregoing and other more specific objects of the invention are achieved will appear in the more detailed description of a preferred embodiment of the invention which follows shortly hereinafter.

DESCRIPTION OF A PREFERRED EMBODIMENT

Figure 1:
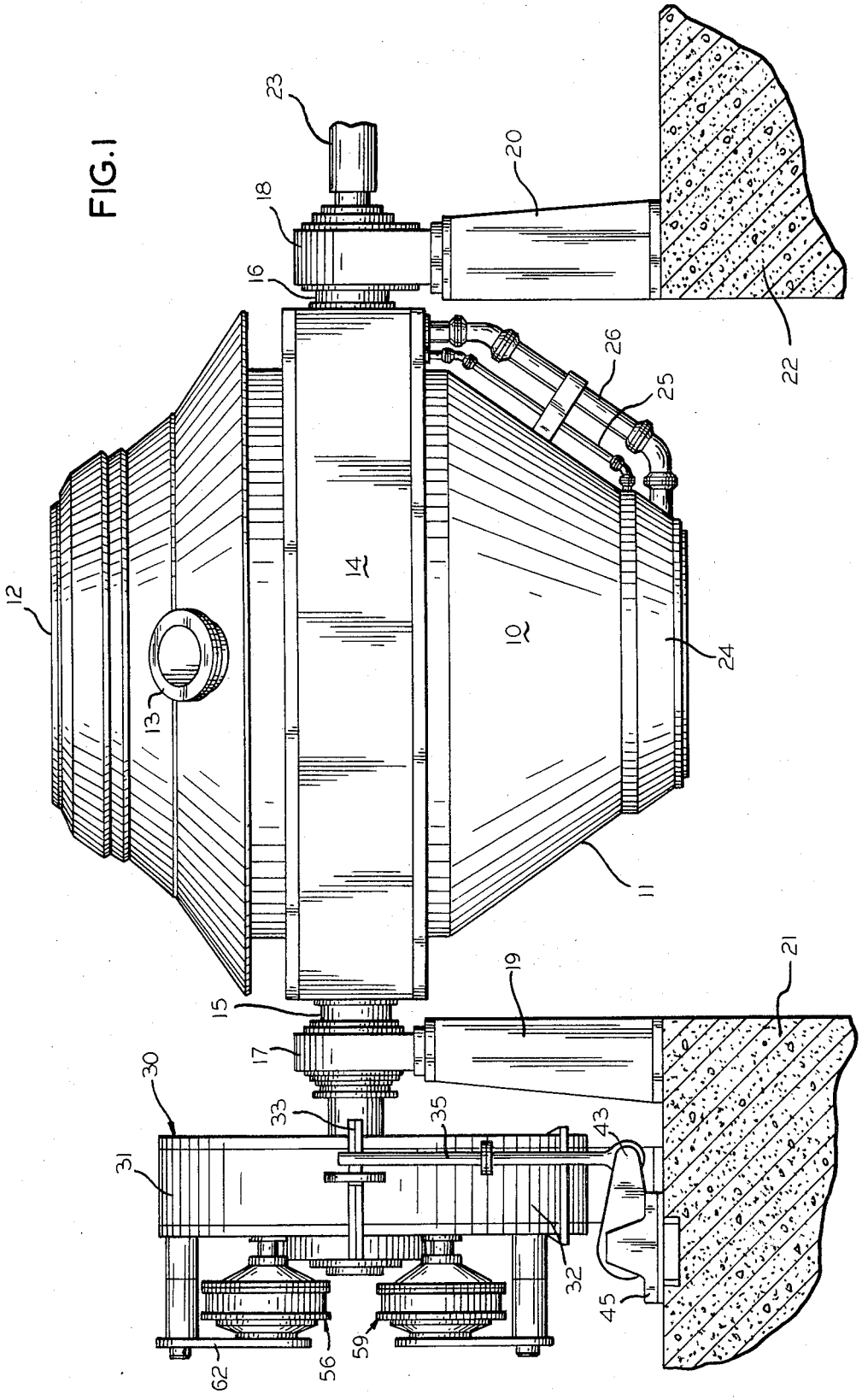
FIG. 1 is a side elevational view of a converter vessel employing the new hydraulic drive mechanism.

FIG. 1 shows a typical steel converter vessel 10 with which the new drive mechanism may be used. The vessel comprises a metal shell 11 which has a refractory lining, not shown. The vessel has an open top mouth 12 to facilitate charging it with impure hot metal, scrap and other materials such as fluxes which are necessary for the refining process which is carried out in the vessel. The vessel may be inverted to discharge slag and other residues out of mouth 12 and the vessel may be tilted to a limited degree for discharging the molten metal through a pouring spout 13.

A trunnion ring 14 surrounds and supports vessel 10 within it. Extending from opposite sides of the trunnion ring are trunnion shafts 15 and 16. The trunnion shafts are respectively journaled in bearing structures 17 and 18 which are in turn supported on columns 19 and 20. The columns are supported on foundations 21 and 22.

Trunnion shaft 16 has some internal passageways, not shown, for delivering from a rotary joint 23 gases and gas entrained powdered materials which are introduced into vessel 10 in connection with the bottom blown refining process. For this purpose, vessel 10 is equipped with a bottom chamber 24 to which are connected a pair of pipes 25 and 26 which lead back to the passageways in trunnion shaft 16. During the refining process, pipe 25 may conduct hydrocarbon fluid which is injected into vessel 10 through tuyeres, not shown, in the bottom of the vessel and pipe 26 may conduct oxygen in which powdered fluxes such as lime and fluorspar are entrained. The gases and powdered solid materials permeate through the molten metal within vessel 10 and react chemically with the constituents of the melt so that refined metal is produced as is well known. The new drive mechanism may also be used with top blown converter vessels, not shown, in connection with which oxygen is injected by means of a lance that is inserted through the top mouth of the vessel.

Figure 2:
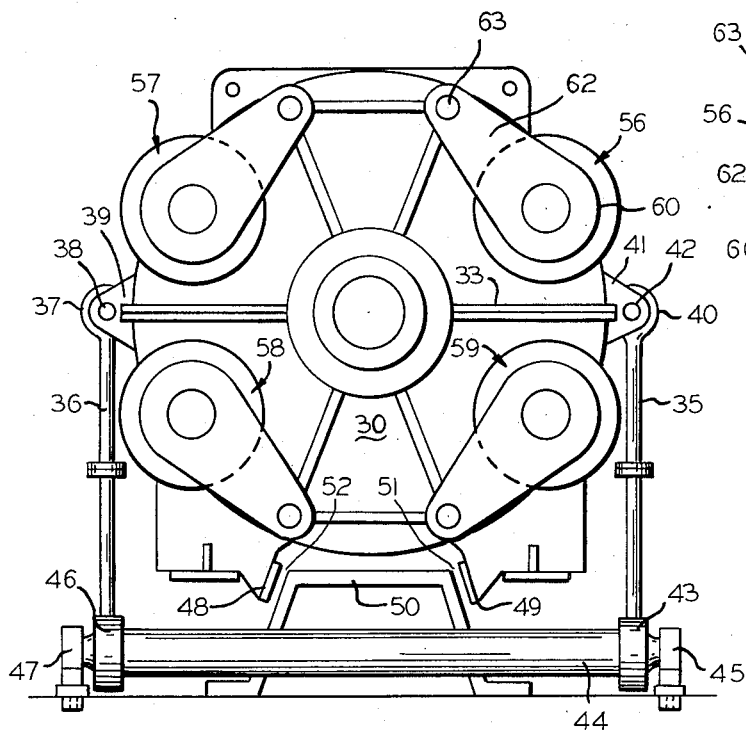
FIG. 2 is an end elevational view of the vessel drive mechanism, the vessel itself being omitted.
Figure 3:
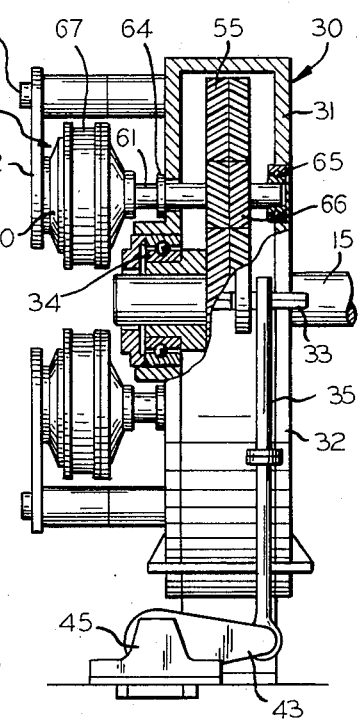
FIG. 3 is a front elevational view of the drive mechanism with parts broken away and parts shown in section.

In FIGS. 1-3 it is apparent that the horizontal trunnion shaft 15 extends through journal 17 and into a gear housing 30. The gear housing is a heavy metal structure which is split into upper and lower sections 31 and 32 that are joined by a flange 33. The flange bolts are omitted from the drawing. The bottom portion 32 of gear housing 30 may be partially occupied by lubricant.

One may see particularly well in FIG. 3 that gear housing 30 is supported by means of a pair of bearings one of which 34 is visible. The inner races of bearings 34 are pressed on hub extensions 54 which extend from a bull gear or driven gear 55 and the outer races are pressed into the gear housing. In final assembly gear 55 is keyed to shaft 15 and the gear rotates but the gear housing 30 remains stationary. The arrangement permits the drive assembly to be shop assembled and tested and shipped as a complete unit for being coupled to the vessel. The gear housing is anchored against rotation with a torsion bar system which, as can be seen in FIGS. 2 and 3, comprises a pair of vertically extending links 35 and 36. The upper end of link 36, for example, has an eye 37 which engages by means of a pin 38 to a lug 39 which is integral with and extends from gear housing 30. The other vertical link 35 similarly has an eye 40 which connects with a lug 41 by means of a pin 42. As can be seen particularly well in FIG. 3, the lower end of link 35 is rigidly connected to an arm 43 which is rigidly connected to and extends from a torsion bar 44 which is visible in FIG. 2. Torsion bar 44 is journaled in bearing blocks 45 and 47. The other vertical link 36 also similarly connects to an arm 46 which extends from and makes a rigid connection with torsion bar 44. It will be evident from FIG. 2 that rotation of gear housing 30 in either direction is resisted by torsion bar 44. For instance, if the gear housing tends to turn clockwise as viewed in FIG. 2, a compressive stress will be developed in link 35 and a tensile stress in link 36. This will impose moments of opposite direction on arms 43 and 46, thereby tending to twist and develop an opposing torsional stress in torsion bar 44. Correspondingly, counterclockwise rotation of gear housing 30 is prevented by developing a torsional force of the opposite sense in torsion bar 44. The torsion bar arrangement is made strong enough to withstand the normal driving forces imposed on vessel 10 and any shock forces that are incidental to abrupt starting and stopping the rotation of massive converter vessel 10.

As can be seen in FIG. 2, the bottom of gear housing 30 is equipped with a pair of spaced apart stop pads 48 and 49 which are juxtaposed to a stop 50. Stop 50 is fixed to foundation 21 by any suitable means, not shown. There are gaps 51 and 52 normally existing between pads 48 and 49 and the stop 50. If for any reason the torsion bar arrangement is overstressed or broken, the pads 48 or 49 will strike against stop 50 and prevent uncontrolled rotation of gear housing 30 and vessel 10.

FIG. 3 shows the large driven bull gear 55 hub extension 54 affixed to the shaft 15 by a key, not shown, or any other suitable means. The bull gear 55 is almost as large diametrically as the interior of gear housing 30. When bull gear 55 is driven rotatably, vessel 10 rotates at the same angular rate.

In this embodiment, four hydraulic motors 56-59 are mounted on gear housing 30 and are adapted to drive bull gear 44 simultaneously. All of the hydraulic motors, their mountings and associated parts are the same so only motor 56 will be described, primarily in reference to FIG. 3.

Hydraulic motor 56 has a stationary part 60 and the remainder of the motor including its shaft 61 may be considered rotatable. Stationary part 60 is fastened to a torque arm 62 which connects with a stationary post 63 that is set in gear housing 30 as can be seen in FIG. 3. The torque arm 62 thus prevents rotation of stationary part 60 of motor 56 and also contributes to supporting the motor. Motor shaft 61 extends through a seal 64 into gear housing 30. The end of motor shaft 61 is in a bearing 65 which is supported in a suitable recess in the inside wall of gear housing 30. Seal 64 and the mounting of bearing 65 are shown schematically for the sake of simplifying the drawing. A pinion such as the one marked 66 is keyed or otherwise fastened to motor shaft 61. Pinion 66 has herringbone teeth as shown in this example and it meshes with bull gear 55 which has similar teeth. The ratio of the driven gear to the driving pinion is less than 20:1 and is preferably about 12 or 10 to 1. Use of the relatively low speed hydraulic motors permits the pinions to rotate at low speed, nevertheless, compared with the speed of the pinions on much higher speed electric motors which were used heretofore. Each of the hydraulic motors 56-59 has a shaft and a pinion corresponding respectively with shaft 61 and pinion 66 associated with hydraulic motor 56. Normally all of the hydraulic motors are operated at the same time so that all of the pinions 66 impose rotational force on bull gear 55 simultaneously. All motors rotate in the same direction at any given instant during tilting converter vessel 10 in one direction or another. The motors have a rotating annular center band 67 which may be used as a brake drum if desired but the brake bands and the hydraulic actuators for them are not shown in this example.

In the illustrative embodiment of the drive mechanism, four hydraulic motors are used. More or fewer motors may be used depending on the size of the motors and the power required for tilting a particular vessel at a desired speed. In a typical case, the chosen motor sizes are such that any two motors will be capable of supplying enough power for tilting the vessel at a rate that can be tolerated when it is desired to pour the molten metal from the vessel under emergency circumstances rather than let the melt solidify in the vessel. Any three motors also preferably have sufficient power rating to enable operating the vessel as required during three or four hundred heats or until it is necessary to take the vessel out of service for rebuilding its interior refractory lining or for performing other maintenance. Suitable hydraulic motors for use with the new drive mechanism are the Hagglunds type which are available from Bird-Johnson Company in Walpole, Massachusetts. Typically, the motors chosen may have two speed ranges such as from 0 to 16 rpm and from 0 to 32 rpm. In one design, the motors chosen develop 3,080 ft-lbs of torque for each 100 pounds per square inch (psi) applied hydraulic pressure. At 2500 psi each motor will produce 77,000 ft-lbs in the low speed range and 38,500 ft-lbs in the high speed range. Any two of the motors are capable of driving the vessel for a limited period of time. The gear ratio between bull gear 55 and pinions 66 is about 10:1 so that with this type of motor the vessel may be tilted in the range of substantially zero to 3 rpm. The small differential between motor speed and vessel rotational speed substantially eliminates backlash and shocks in the gear system when vessel rotation is started and stopped. With the high ratio speed reducer gear systems that were necessary with conventional electric motor drives, free-play and backlash were always present to an extent that when the vessel was tilted for teeming it had to be jogged to its desired angular position. The use of low speed hydraulic motors and a simple low ratio gear reduction system in accordance with the invention, eliminate the need for jogging the vessel because it now starts and stops smoothly and precisely. The hydraulic motors may be blocked with a counterbalancing valve, discussed later, when the motors are at rest so that the motors will offer resistance to the short amplitude rotational oscillations of the vessel which are incident to its operation. Blocking of the motors and the absence of free-play in the system thus prevents the bearings in which the trunnion shafts of the vessel are journaled from Brinnelling.

When prior art electric motor drives were used, it was necessary to run very heavy power cables to the motors and to employ high capacity electric controls and brakes. This requires special measures to protect the cables and the other elements of the drive mechanism from damage by the high heat which prevails in the vicinity of the metallurgical vessel and from being damaged or contaminated by molten metal or slag which sometimes sputters out of the vessel. Use of hydraulic motors, in accordance with the invention, minimizes these problems. The hydraulic fluid conducting tubes which run to the hydraulic motors are practically immune to the effects of heat. The control valves are somewhat remote from the motors mounted on the hydraulic power unit. The power unit is far enough from the vessel to minimize the effect of the heat.

Figure 4:
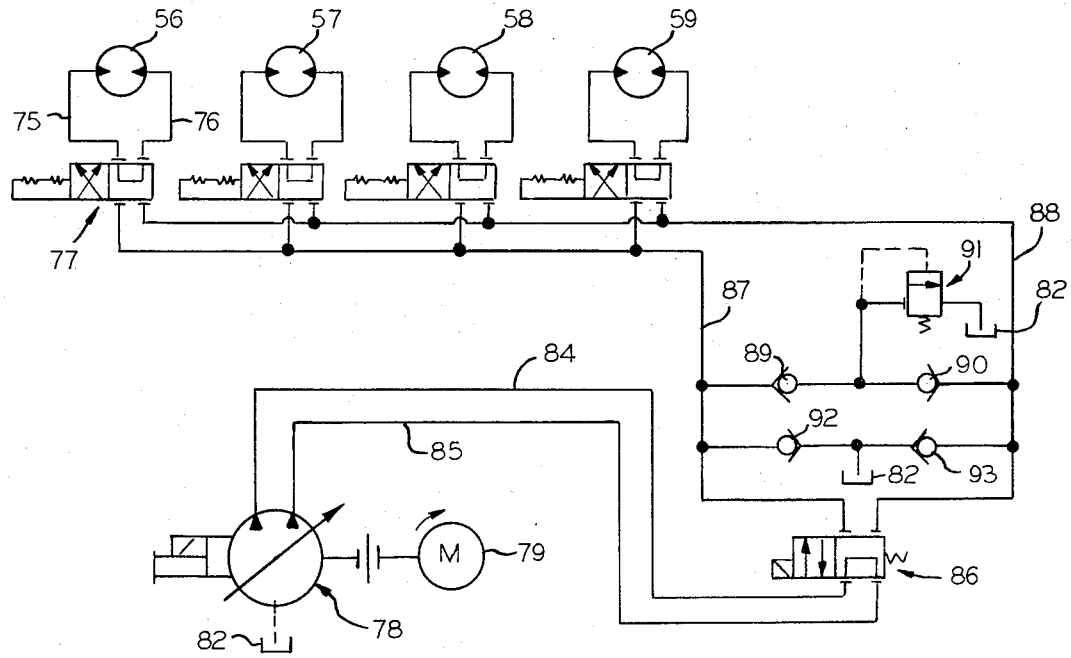
FIG. 4 is a schematic diagram of the hydraulic system employed with the drive mechanism in which the hydraulic components are represented graphically.

The hydraulic system is illustrated schematically in FIG. 4. The hydraulic motors are shown graphically and are marked with the reference numerals 56–59 as are the corresponding motors on the drive mechanism which is depicted in FIGS. 1–3. Motors 56–59 are reversible and preferably all of the same type and capacity. All motors are controlled in the same manner so only motor 56 and its associated controls will be described for the sake of brevity. Motor 56 has two hydraulic fluid lines 75 and 76 connected to it. The other motors are similarly connected. These lines lead to a manually operated four-way valve 77. When the spools of these valves are in the position shown, free-wheeling of the motors 56–59 is permitted; that is, the motors do not offer hydraulic resistance to rotation of vessel 10 nor is the vessel driven by the motors.

Valve 77 is for emergency use only. In case of a malfunction of one of the hydraulic motors 56–59 the valve permits maintenance work on the particular motor without requiring that the drive as a whole be shut down. Also, if vessel 10 is to be rotated by means other than the hydraulic drive, the free-wheeling feature of valves such as 77 will make this possible.

The hydraulic motors 56–59 are supplied with high pressure operating fluid from a pump 78 which is driven by an electric motor 79. Pump 78 is of the variable delivery reversing type and is servo controlled. One or the other lines 84 or 85 becomes the pressurized output line depending on the rotational direction of pump 78. The pump draws fluid from a reservoir 82. Lines 84 and 85 connect the pump to a four-way valve 86. This valve 86 is a solenoid controlled, pilot operated and spring offset type; with the solenoid deenergized it will block the circuit to motors 56–59 and let the pump bypass.

The main purpose of valve 86 is to prevent the motors 56–59 from turning when their associated valves 77 and the like are not in free-wheeling position. Valve 86 may also be used for emergency braking since in case of a power failure the valve will automatically transfer to its shown position and stop vessel rotation automatically. The solenoid has a manual override. Shifting the valve to its spring offset position or shifting the pump to neutral or center position actuates the braking circuit.

When valve 86 is open or transferred from the state in which it is shown, either line 87 or 88 will be pressurized depending on rotational direction of pump 78, and motors 56–59 rotate in a direction that depends on which line is fed with high pressure fluid. The outflow from motors 56–59 has to go through check valves 89 or 90, depending on rotational direction, and then through a relief valve 91 to reservoir 82. Depending upon the setting of relief valve 91 the braking effect can be rather severe. In order to prevent motors 56–59 from cavitating, which is detrimental to them, check valves 92 and 93 are provided to enable hydraulic fluid to be sucked into the motors from the reservoir 82 to replace the fluid which is pushed out through relief valve 91.

The valve system holds the vessel stable during operation and prevents the low amplitude vibrations or oscillations which might otherwise Brinnell or wear the trunnion bearings as was the case in prior drive systems which had considerable free-play.

In summary, a new hydraulic drive mechanism for metallurgical vessels has been described. The mechanism is distinguished by having a high safety factor resulting from the ability to either drive the vessel or stop it with only two of the several hydraulic motors which are used on the drive. The drive mechanism occupies less floor space than those heretofore used and yet it is rugged and reliable. The life of the mechanism is longer than electric motor drives since the gear train is short as compared with such drives and the backlash and shocking forces which have heretofore resulted in premature deterioration of the drive components are substantially eliminated. The hydraulic motors, their associated gearing and the vessel itself all operate at relatively low speed in which case gear and bearing life are substantially extended as compared with prior drive mechanisms which use electric motors. With the new drive mechanism, operation of the vessel is smooth and there is no necessity to jog the vessel to bring it to an exact final position. The small free-play which is attainable with the system minimizes vessel vibration during operation so that Brinnelling of bearings is substantially eliminated.

Although a preferred embodiment of the invention has been described in considerable detail, such description is intended to be illustrative rather than limiting, for the invention may be variously embodied and is to be limited only by interpretation of the claims which follow.

We claim:
1. In combination:
 a. a vessel for treating molten metal,
 b. trunnion ring means surrounding and supporting said vessel,
 c. trunnion shafts extending from opposite sides of said ring with their axes aligned and substantially horizontal,
 d. spaced apart fixed supports and bearing means on said supports in which said trunnion shafts, respectively, are journaled to enable tilting said vessel,
 e. a driven gear affixed to at least one of said shafts,
 f. gear housing means supported by said shaft adjacent said bearing means, said shaft and driven gear being rotatable with respect to said gear housing,
 g. means for restraining said gear housing from rotating,
 h. a plurality of hydraulic motor means mounted on said housing means in circumferentially spaced relationship around said shaft,
 i. each of said hydraulic motor means having an output shaft means extending into said gear housing means in parallelism with said trunnion shaft and each output shaft means having pinion gear means affixed thereon meshed with said driven gear and constituting a direct driving connection between said hydraulic motor means and said driven gear.
2. The invention set forth in claim 1 including:
 a. bearing means mounted on said housing and supporting and journaling the respective motor output shafts for rotation in said housing.
3. The invention set forth in claim 1 wherein:
 a. the ratio of the rotational rate of a hydraulic motor to the rotational rate of the driven gear is no greater than 20 to 1.
4. The invention set forth in claim 1 wherein:
 a. the ratio of the rotational rate of a hydraulic motor to the rotational rate of the driven gear is about 10 or 12 to 1.
5. The invention set forth in claim 1 wherein:
 a. said hydraulic motors each have first and second relatively rotatable parts the second of which is rotatable with said output shaft, and
 b. torque arm means fastened to said first part to hold the part stationary, each said torque arm means also being secured to said housing.
6. The invention set forth in claim 1 including:
 a. a source of pressurized hydraulic fluid,
 b. a pair of lines that are adapted to be selectively pressurized and unpressurized, respectively, said lines interconnecting the source and said hydraulic motors on said gear housing,
 c. first valve means interposed in said lines, said valve means being selectively actuable to bypass fluid back to said source or pass fluid to said motor means, said valve means also being operable to block the lines to said motors and to bypass fluid to thereby prevent application of fluid pressure which would cause rotation of said motors, and
 d. second valve means interposed in said lines between said first valve means and each of said motors, said second valve means having their respective input ports connected across said pair of lines and their output ports connected across the ports of their associated motors, said second valve means being selectively operable to one position for conducting fluid to and from said motors and to another position interconnecting said motor ports whereby said motors become free-wheeling,
 e. a first pair of check valve means connected serially between said pair of lines, each said check valve means being adapted for permitting fluid flow and stopping fluid flow respectively oppositely of the other, and
 f. relief valve means having an inlet connected intermediately of said check valve means, said relief valve means permitting fluid flow through one check valve means and from one of the lines from said motors whereby to allow discharge of fluid from said motors and to maintain pressure for braking said motors when said first valve means is actuated to block said lines.
 g. a second pair of check valve means connected serially and in opposite flow relation between said pair of lines and in parallel with said first pair of check valve means,
 h. a hydraulic fluid inlet between said second pair of check valve means, said inlet admitting fluid through one of said second pair of check valve means to said hydraulic motor means to prevent cavitation in said motors due to the outflow of fluid therefrom when said first valve is closed and momentum of said vessel causes discharge of fluid through said relief valve means, i. operation of said first valve to block said lines causing fluid pressure in opposed directions on said motors to thereby restrain said vessel against low amplitude oscillations which could wear or work harden said trunnion shaft bearings when said vessel is being used to treat metal.

7. In combination,
a. a vessel for converting ferrous metal to steel,
b. a trunnion ring surrounding and supporting said vessel,
c. stationary support means spaced apart horizontally with said ring between them, said support means each having bearing means,
d. trunnion shafts extending substantially horizontally from said trunnion ring and journaled in said bearings in said support means whereby said vessel may be rotated to selected angular positions,
e. driven gear means attached to said shaft means,
f. gear housing means journaled with respect to said trunnion shaft and in which said shaft rotates, said housing means substantially enclosing said driven gear means and said housing means deriving its support from said shaft and driven gear assembly,
g. a plurality of hydraulic motor means having fluid inlets and outlets and mounted on said gear housing means, said motor means each having output shafts in parallelism with said trunnion shaft and extending into said gear housing means and spaced radially of said driven gear,
h. pinion means fixed on said motor output shafts respectively, said pinion means each being engaged with said driven gear means and directly coupling said motor shafts with said driven gear, and
i. resilient means opposing turning movement of said gear housing means and stop means in spaced apart but interfering relation with said housing for arresting rotation of said housing when it turns to a predetermined amount allowed by said resilient means, and
j. means for maintaining substantially equal fluid pressure on said motor inlets and outlets when said vessel is operatively converting ferrous metal to steel to thereby stabilize said vessel against low amplitude rotational oscillations and prevent undue wear of said bearings and Brinnelling thereof.

* * * * *